Jan. 13, 1925.
L. LIBERMAN
1,523,025
CLUTCH MECHANISM
Filed March 5, 1921
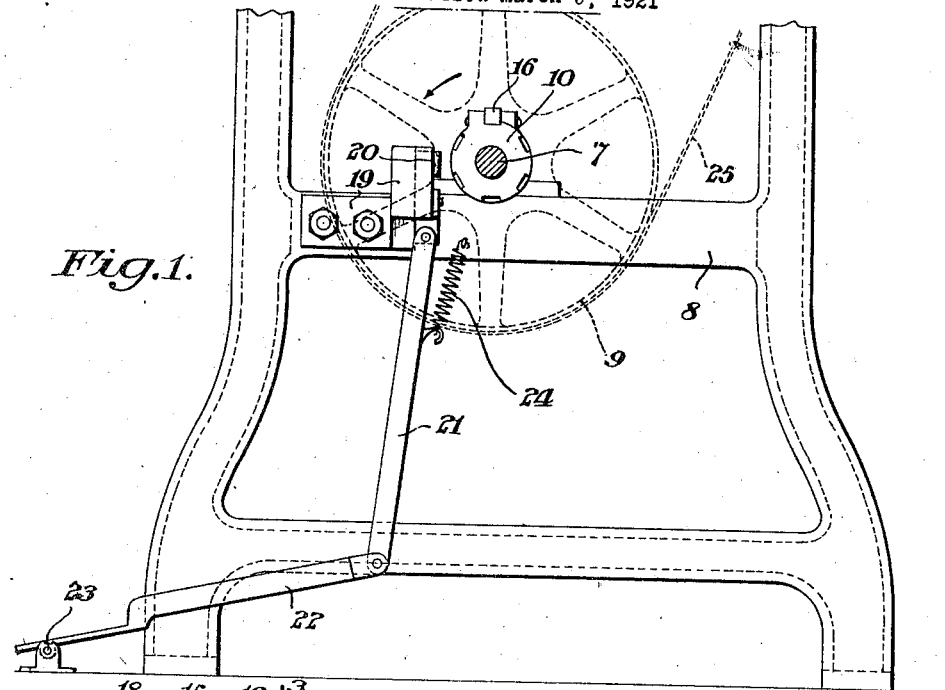
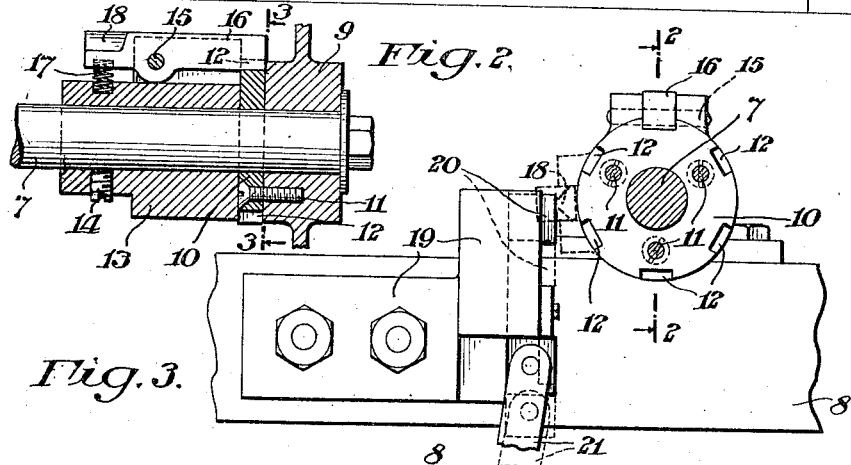
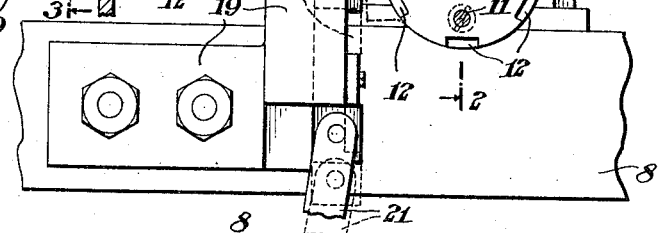
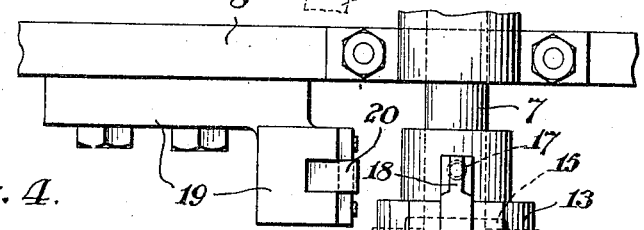
Inventor:
Leon Liberman,
By [signature]
Attorney.

Patented Jan. 13, 1925.

1,523,025

UNITED STATES PATENT OFFICE.

LEON LIBERMAN, OF PHILADELPHIA, PENNSYLVANIA, ASSIGNOR TO BERNARD LIBERMAN, OF PHILADELPHIA, PENNSYLVANIA.

CLUTCH MECHANISM.

Application filed March 5, 1921. Serial No. 449,651.

*To all whom it may concern:*

Be it known that I, LEON LIBERMAN, a citizen of the United States, residing at Philadelphia, in the county of Philadelphia, State of Pennsylvania, have invented a new and useful Clutch Mechanism, of which the following is a specification.

My invention relates to improvements in clutch mechanism. The object is to provide improved arbitrarily controlled means for coupling a driving and driven element to secure a co-action of the two elements through a complete rotation, and for normally causing an automatic release between said elements at the end of said complete rotation.

Referring to the drawings, which illustrate merely by way of example a suitable embodiment of my invention:—

Fig. 1 is a side elevation.

Fig. 2 is a section on line 2—2 of Fig. 3.

Fig. 3 is a section on line 3—3 of Fig. 2.

Fig. 4 is a plan view of the structure shown in Figs. 2 and 3; Figs. 2, 3 and 4 being on a scale larger than that of Fig. 1.

Similar numerals refer to similar parts throughout the several views.

In the example illustrated in the drawings I have shown a shaft 7 journalled in any suitable way upon the frame 8. Loosely mounted on shaft 7 is a driving wheel 9, to which is secured the clutch element 10, as for example by the screws 11. This element 10 is provided with the peripheral notches or recesses 12. The element 13 is also mounted on shaft 7 and rotatably fixed thereto, as by means of the set screw 14. Pivotally mounted in a slot in element 13, by means of the pivot 15, is the pawl or dog 16, having one end adapted to seat in a notch 12 of element 10. A spring 17 is secured between the other end of dog 16 and the adjacent part of element 13. This end of the dog is provided with the tapered engaging edge 18.

Secured to the frame 8 is the bracket 19 providing a housing for the sliding element or detent 20. This sliding element of detent 20 is connected, by the connecting rod 21, to the pedal member 22, pivoted at 23. A spring 24 connected between the rod 21 and the frame 8 serves normally to hold the detent 20 in the elevated position.

In operation the wheel 9 is adapted to be driven continuously, as for example by the belt 25 from any suitable source of power. The dog 16, controlled by spring 17, is adapted normally to engage in one of the slots 12 in element 10, and thus lock elements 10 and 13 together, and consequently, wheel 9 with shaft 7, to cause a rotation of shaft 7 to perform any required work. This would cause a continuous rotation of shaft 7 as long as wheel 9 rotates, were it not for the fact that as the elements rotate the tapered end 18 of dog 16 encounters the detent 20 when in the normal or elevated position, and causes a withdrawal of the other end of dog 16 from the notch 12 of element 10 with which it is engaged. When this disengagement between dog 16 and a notch 12 of element 10 takes place, the element 13 is operatively released from element 10, so that shaft 7 ceases to rotate.

The position of engagement of dog 16 with element 10 is shown in Fig. 2. The position of disengagement of the dog is indicated in Fig. 3, by the end 18 of dog 16 shown in dotted lines, engaging with detent 20. So long as the end 18 of dog 16 is depressed by the detent 20, the driving wheel 9 rotates loosely on shaft 7, without rotating the shaft, and this continues so long as detent 20 remains in the elevated position as shown in Figs. 1 and 3, due to the action of spring 24.

When however, the pedal 22 is operated in opposition to spring tension 24, the detent 20 is depressed and moved out of engagement with said dog 16; this permits the coupling of elements 10 and 13, and the actuation of shaft 7. If the pedal is released after being depressed and before a complete rotation of the shaft 7, the detent 20 returns to the elevated position, due to the action of the spring 24, and again engages the dog 16 at the end of the complete rotation, automatically to cause the release of element 13 from element 10 as above described.

In order to prevent possibility of jamming between dog 16 and detent 20, it is preferable to have the point of engagement between dog 16 and detent 20 slightly below a radius from the axis of shaft 7 drawn at right angles to the plane of movement of detent 20.

What I claim is:—

In a clutch mechanism, the combination of a supporting frame, an actuating shaft journalled thereon, a driving wheel loosely mounted on the shaft, a clutch element comprising a disc having a periphery corresponding approximately with that of the wheel hub and provided with evenly spaced peripheral notches, said disc rigidly secured to the end of said hub, a slotted member fixed on the shaft adjacent the disc, a spring actuated dog pivotally mounted in the slotted member and adapted to engage a notch of the disc, a bracket secured to the frame provided with a vertically extending channel, a member slidably secured in said channel adapted when in one position to engage the dog at one point of its rotating movement with the shaft to disengage said dog from a notch, and a spring controlled pedal and connecting mechanism for arbitrarily actuating the slidable member as required.

LEON LIBERMAN.